United States Patent [19]

Amantini

[11] Patent Number: 4,716,758
[45] Date of Patent: Jan. 5, 1988

[54] METHOD OF PREDICTING AND MONITORING THE IMPERVIOUSNESS OF AN UNDERGROUND CAVERN

[75] Inventor: Eric Amantini, Courbevoie, France

[73] Assignee: Societe Francaise de Stockage Geologique - GEOSTOCK, Paris, France

[21] Appl. No.: 933,512

[22] Filed: Nov. 21, 1986

[30] Foreign Application Priority Data

Nov. 21, 1985 [FR] France ............... 85 17230

[51] Int. Cl.$^4$ ............................... G01N 15/08
[52] U.S. Cl. ........................................ 73/38
[58] Field of Search .............. 73/38, 40, 40.5 R, 37

[56] References Cited

U.S. PATENT DOCUMENTS 2,747,401  5/1956  Doll ............................. 73/38 X
4,474,053  10/1984  Butler .......................... 73/40

FOREIGN PATENT DOCUMENTS 779859  11/1980  U.S.S.R. ...................... 73/38

*Primary Examiner*—Stewart J. Levy
*Assistant Examiner*—Joseph W. Roskos
*Attorney, Agent, or Firm*—Sughrue, Mion, Zinn, Macpeak and Seas

[57] ABSTRACT

The imperviousness of an underground storage cavern for hydrocarbons in a water-impregnated rock formation is predicted and monitored by progressively increasing the pressure in the cavern and using pressure sensors placed around the cavern to monitor the gradient of the hydraulic pressure potential $\phi$ in the rock formation during the pressure rise in order to check that the gradient is not inverted.

5 Claims, No Drawings

METHOD OF PREDICTING AND MONITORING THE IMPERVIOUSNESS OF AN UNDERGROUND CAVERN

The present invention relates to underground storage techniques for liquid or gaseous products, and in particular liquefiable compressed gases which are not soluble in water, e.g. hydrocarbons.

BACKGROUND OF THE INVENTION

Such a storage facility is made by digging one or more caverns of appropriate shapes and sizes given the intended use and the nature of the terrain, or by modifying pre-existing natural or artificial voids such as mines, quarries, etc. The storage facility is located at a depth below the level of the water table in a water-saturated rock formation whose permeability depends on the site.

The pressure of the stored products is generally greater than atmospheric pressure and as a result it must be ensured that the cavern is impervious, i.e. that there is no possibility of the product penetrating into the ground by infiltration. Such imperviousness is generally obtained by means of a continuous flow of water into the cavern from the surrounding rock formation through the walls of the cavern. Under substantially constant pressure conditions, a permanent flow regime is established, and it has become common practice to suppose that the necessary height between the top of the cavern and the lowest point of the water table should not be less than the pressure of the gas in the cavern (expressed as a column of water), in order to ensure that the stored product does not infiltrate into the rock formation, i.e. in order to be sure that the product does not leak out, with the resulting pressure difference being considered as providing a margin of safety.

French published patent application No. 2 473 618 in the name of Geostock relates to a method of reducing the safety margin to as small a value as possible, and describes a magnitude called a "form parameter" which is expressed in pressure units and which makes it possible to determine the minimum safety margin which can be used.

However, these considerations are applicable solely to a permanent regime. when the pressure in the cavern varies, for example when its pressure is being raised to a "test" pressure in order to test its imperviousness, or when product is inserted therein at a temperature greater than its storage temperature, the flow regime around the cavern is no longer "permanent" and transient phenomena occur which may invert the direction of water flow and thus allow product to infiltrate to some extent into the rock formation around the cavern. The cavern is then no longer "impervious" in the sense described above. These transient phenomena then tend to die away progressively so that there is a return to the permanent regime. The duration of the transient phenomena depends, inter alia, on the nature and the permeability of the rock formation.

Thus, although the above-mentioned form parameter is a criterion representative of static imperviousness, a criterion is still required which is representative of dynamic imperviousness, i.e. of imperviousness under varying pressure conditions. The present invention relates to this problem.

One of the aims of the present invention is to provide a method of predicting and monitoring the imperviousness of an underground cavern made in a water-impregnated rock formation, in particular when the pressure of the stored product is liable to vary.

The flow of water between the rock formation and the cavern runs along decreasing hydraulic pressure potentials, with the hydraulic pressure potential $\phi$ at any given point being defined by the equation:

$$\phi = p - \rho g z$$

where:
$\phi$ = the potential at the point under consideration;
p = the pressure at the point under consideration;
$\rho$ = the density of water;
g = acceleration due to gravity; and
z = the height of the column of water.

The speed of flow $\vec{v}$ then has the form:

$$\vec{v} = -k \, \overrightarrow{\text{grad}} \, \phi$$

SUMMARY OF THE INVENTION

The present invention provides a method of predicting and monitoring the imperviousness of an underground cavern made in a water-impregnated rock formation, the method comprising:

determining or calculating the gradient in the hydraulic pressure potential $\phi$ at any point in the rock formation within a certain distance from the cavern using a model which is advantageously based on finite elements, or by observing and measuring said potential gradients on a reduced scale model of the cavern;

determining a possible rate of pressure rise in said cavern from said calculations and measurements;

progressively raising the pressure inside the cavern; and using pressure sensors placed around the cavern to monitor the gradient of the hydraulic pressure potential $\phi$ in situ during the pressure rise in the cavern in order to verify that the gradient is not inverted.

The pressure sensors are advantageously placed along at least one probable line of flow with at least two sensors being used per probable line of flow, and with one of the two sensors being situated relatively close to the cavern, i.e. at a distance of one to a few meters, said pressure sensors may include piezo-electric transducers.

I claim:

1. A method of predicting and monitoring the imperviousness of an underground cavern formed in a water-impregnated rock formation, the method comprising the steps of:
   (a) disposing at least two pressure sensors in the formation around the cavern at different distances therefrom and spaced from each other;
   (b) progressively raising the pressure inside the cavern; and
   (c) monitoring the gradient of the hydraulic pressure potential $\phi$ in the rock formation during the pressure increase to confirm that said gradient is not inverted.

2. A method of predicting and monitoring the imperviousness of an underground cavern formed in a water-impregnated rock formation, the method comprising the steps of:
   (a) disposing at least two pressure sensors in the formation around the cavern at different distances therefrom and spaced from each other;

(b) calculating the gradient of the hydraulic pressure potential $\phi$ at any point in the rock formation over a predetermined distance from the cavern by means of a computational model or by performing measurements on a reduced scale model of the cavern;

(c) determining a possible rate of pressure rise in said cavern from said calculations and/or measurements;

(d) progressively raising the pressure inside the cavern; and (e) monitoring the gradient of the hydraulic pressure potential $\phi$ in the rock formation during the pressure increase in said cavern to confirm that said gradient is not inverted.

3. A method according to claims 1 or 2, wherein said pressure sensors are disposed around the cavern along at least one probable line of flow, with one of the sensors being situated relatively close to the cavern at a distance of one to a few meters from a wall thereof.

4. A method according to claim 3, wherein said pressure sensors are piezo-electric transducers.

5. A method according to claim 2, wherein said computational model is a finite element model.

* * * * *